Nov. 10, 1953  R. R. MOSHER  2,658,345
REVERSIBLE TURBINE TYPE FLUID COUPLING
Filed Oct. 31, 1952  2 Sheets-Sheet 1

INVENTOR.
ROLAND R. MOSHER
BY
McMorrow, Berman & Davidson
ATTORNEYS

Nov. 10, 1953 — R. R. MOSHER — 2,658,345
REVERSIBLE TURBINE TYPE FLUID COUPLING
Filed Oct. 31, 1952 — 2 Sheets-Sheet 2
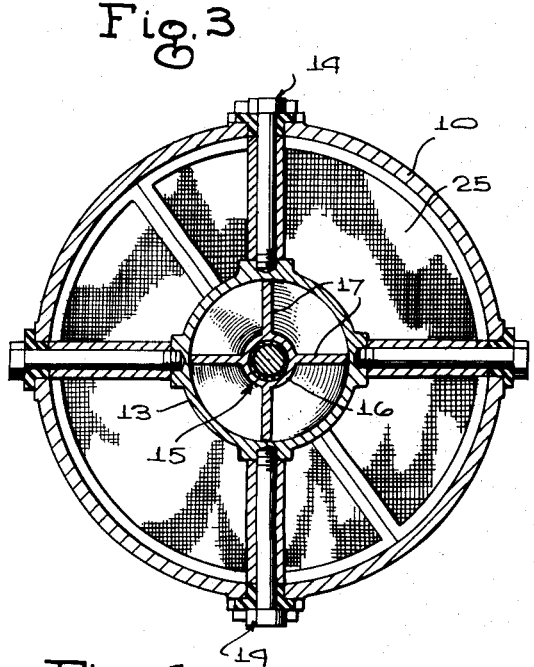
Fig. 3
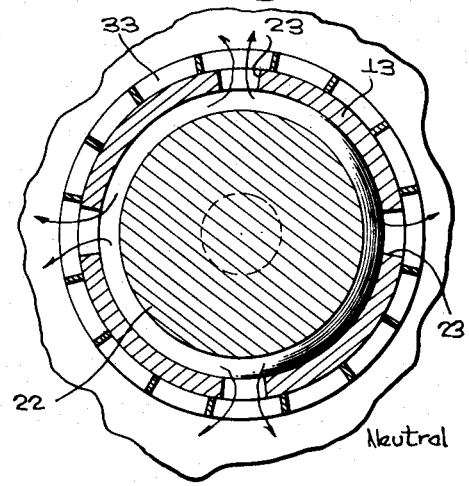
Fig. 5 — Neutral
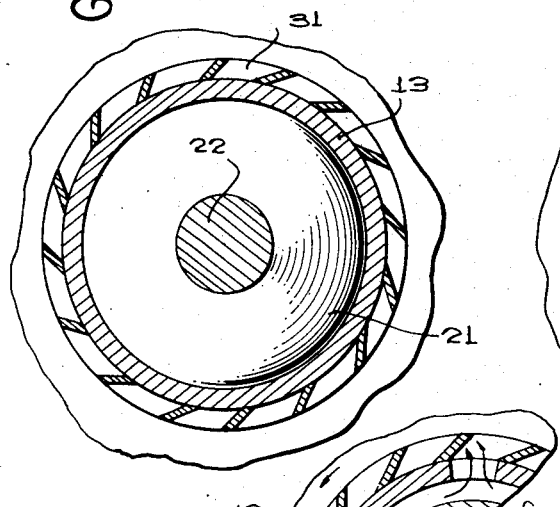
Fig. 4
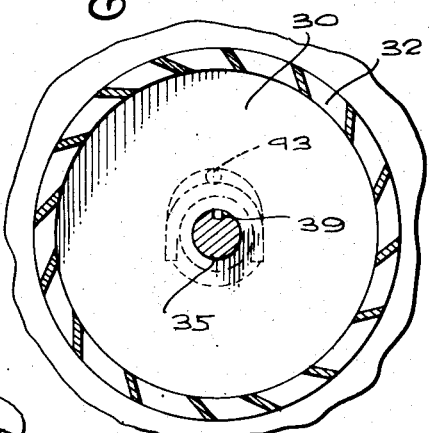
Fig. 6
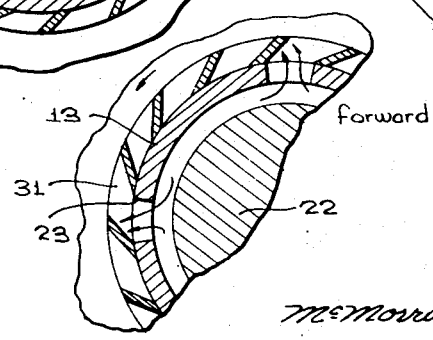
Fig. 7
INVENTOR.
ROLAND R. MOSHER
BY
McMorrow, Berman & Davidson
ATTORNEYS Patented Nov. 10, 1953

2,658,345

UNITED STATES PATENT OFFICE 2,658,345

REVERSIBLE TURBINE TYPE FLUID COUPLING

Roland Robert Mosher, Jackson, Mich.

Application October 31, 1952, Serial No. 318,061

4 Claims. (Cl. 60—54)

This invention relates to a reversible fluid coupling.

An object of the present invention is to provide a fluid coupling wherein both forward and reverse drive is imparted from a drive to a driven member through the medium of a hydraulic fluid.

Another object of the present invention is to provide a fluid coupling which is simple in structure, and highly efficient in operation.

Other objects and advantages of the present invention will become apparent from the following description taken in conjunction with the accompanying drawings, wherein:

Figure 3 is a transverse sectional view taken on the line 3—3 of Figure 2.

Figures 4, 5 and 6 are transverse sectional views taken on the lines, 4—4, 5—5, and 6—6, respectively, of Figure 2.

Figure 7 is a fragmentary view of the assembly of Figure 4, but showing the runner moved to the forward drive position and the direction of flow of fluid relative to the turbine blades of the forward drive row on the runner.

Figure 1:
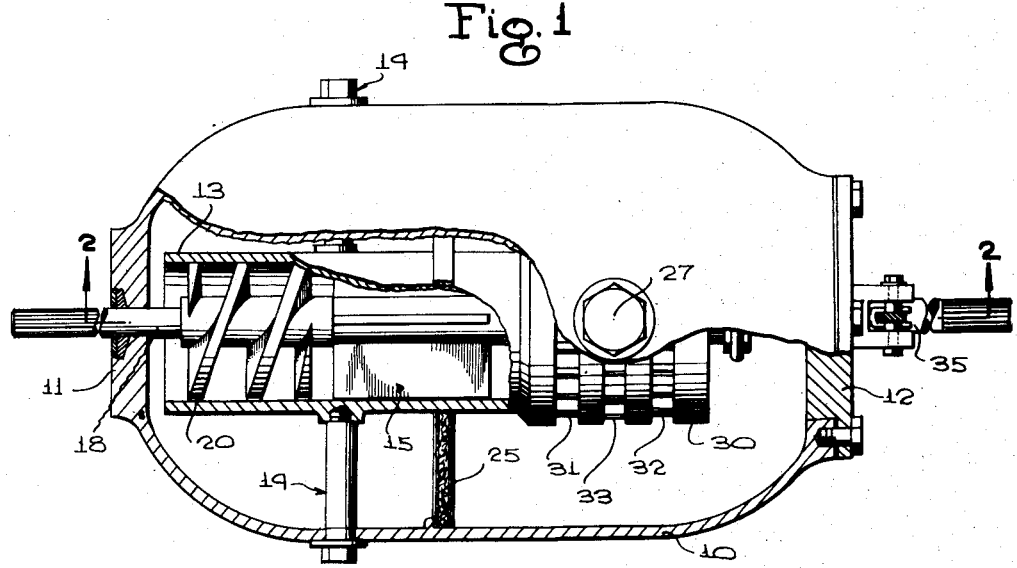
Figure 1 is a plan view of the reversible fluid coupling of the present invention, with parts broken away to show the internal structure.

Referring to the drawings, the reversible fluid coupling of the present invention comprises a casing 10 having both ends 11 and 12 respectively closed. Positioned within and extending longitudinally of such casing and spaced from the latter is an open ended sleeve 13, the space surrounding the sleeve defining a fluid space for hydraulic fluid. The sleeve 13 is fixedly secured intermediate its ends to the casing 10 by means of bolt and nut assemblies 14, four being shown in Figure 3, and arranged in radial spaced relation about the sleeve. One of the ends of the sleeve 13 is adjacent to and spaced from the end 11 of the casing 10 for ingress of the hydraulic fluid contained in the space surrounding the sleeve and to the said one end of the sleeve. Disposed within the sleeve 13 inwardly of and spaced from the end 11 of the casing 10 is a fixed vane assembly 15, the assembly, Figure 3, including a hub 16 and a plurality of vanes 17 arranged in longitudinal radial relation about the hub 16.

Figure 2:
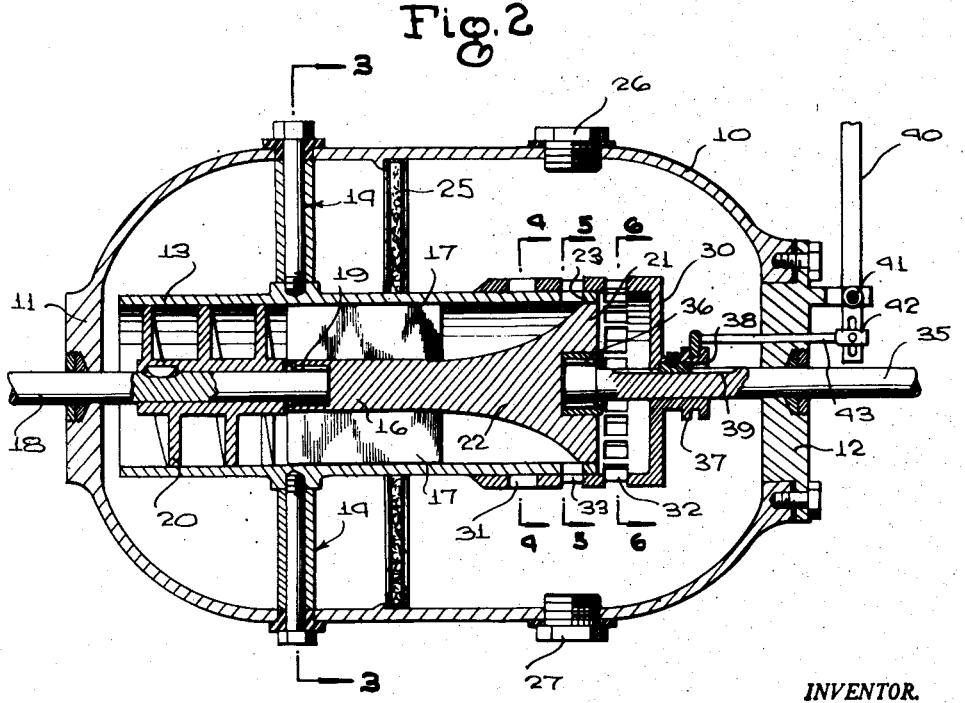
Figure 2 is a longitudinal sectional view taken on the line 2—2 of Figure 1.

Journaled through the end 11 of the casing 10 is a drive shaft 18, the shaft extending inwardly into the sleeve 13 and having the inner end rotatably supported in the hub 16. Specifically, the hub is recessed in the end face contiguous to the drive shaft 18 and in such recess are bearings 19 which rotatably support the inner end of the shaft 18. Carried by or keyed to the portion of the drive shaft 18 intermediate the one end of the sleeve 13 and the vane assembly 15 is a rotor 20, the rotor being in the form of a spiral screw spiraled in a direction to draw fluid contained in the space surrounding the sleeve 13 into the one open end of the latter and force the fluid in the sleeve toward and through the vane assembly when the drive shaft is rotated in a predetermined direction. A cylindrical head 21 is positioned within and closes the other end of the sleeve 13, the head being fixedly connected to the hub 16 of the vane assembly 15 by means of a shank 22 which is spaced from the sleeve and extends between the hub 16 and the head 21. The sleeve 13, Figure 5, is provided with a plurality of radial slots 23 arranged in a circle adjacent to the head 21. As shown in Figure 2, the shank 22 is concavely curved and tapers from the head 21 toward and to the hub 16 of the vane assembly 15 and forms with the adjacent portion of the sleeve a passage for directing the fluid in the sleeve toward the slots 23 in the sleeve.

A fixed screen 25, Figures 2 and 3, is circumposed transversely about the sleeve 13 and spaced from the other end of the latter or the end which has the head 21 closing same. The casing 10 has an openable inlet closure 26 for the introduction of hydraulic fluid therein, and also an openable outlet closure 27 for withdrawing hydraulic fluid therefrom.

A hollow cylindrical runner 30, Figure 2, faces and surrounds the closed end of the sleeve 13 and is mounted on the sleeve for longitudinal sliding movement. The runner has three circular rows of turbine blades arranged in longitudinal spaced relation therealong, one of the rows designated by the numeral 31 having the blades projecting at an angle from the runner to form a forward drive, another of the rows designated by the numeral 32 projecting from the runner at an angle opposite to that of the one row 31 to form a reverse drive, and the further of the rows designated by the numeral 33 projecting at an angle from the runner different from that of either of said rows 31 and 32 to form a neutral drive. Specifically, the blades of the rows 31 and 32 are at opposed acute angles with respect to the runner, while the blades of the rows 33 project perpendicularly from the runner.

A driven shaft 35 is journaled through the other closed end or end 12 of the casing 10 and extends inwardly through the runner 30 and has the inner end rotatably supported in the head 21. Specifically, the head 21 is recessed in the end face contiguous to the driven shaft 35 and in such recess are bearings 36 which rotatably support the inner end of the shaft 35. The runner 30, Figure 2, is connected to the driven shaft 35 for longitudinal reciprocatory movement. Specifically, the runner 30 has a collar 37 which carries a key 38 slidably engaging a longitudinal keyway 39 formed in the driven shaft 35. Manual means is operatively connected to the runner 30 for effecting the reciprocatory movement of the latter, such means embodying an upstanding lever 40 arranged exteriorly of the closed end 12 of the casing 10 and being pivotally connected intermediate its ends to the closed end 12 as at 41, the lower end of the lever being connected by a pin and slot connection 42 to the adjacent end of an arm 43 which is attached to the collar 32.

In operation of the fluid coupling of the present invention, with casing 10 filled with hydraulic fluid and the runner 30 in neutral drive position, the position of Figure 2, actuation of the lever 40 in the direction to cause sliding movement of the runner 30 to bring the row 31 in registry with the slots 23 of the sleeve 13, results in the flow of hydraulic fluid from the sleeve 13 to the guiding passage between the shank 22, head 21 and the sleeve 13 outwardly through the slots 23 and against the blades of the row 31 and rotation of the driven shaft 35 in the forward or clockwise direction.

Actuation of the lever 40 in the direction to shift the row 33 out of registry with the slots 23 of the sleeve 13, the position of Figure 2, and bring the row 32 into registry with the slots 23 of the sleeve 13, results in the flow of the hydraulic fluid from the sleeve through the guiding passage between the shank 22, head 21, and sleeve 13 outwardly through the slots 23 and against the blades of the row 32 and rotation of the driven shaft 35 in the reverse or counterclockwise direction.

Having fully described the invention, what I claim as new and desire to secure by Letters Patent is:

1. In a fluid coupling, a casing having both ends closed, an open ended sleeve positioned within and extending longitudinally of said casing and spaced from said casing and fixedly secured intermediate its ends to said casing, the space surrounding said sleeve defining a fluid space, one end of said sleeve being adjacent to and spaced from one of the closed ends of said casing, a fixed vane assembly in said sleeve inwardly of and spaced from said one closed end of said casing, said assembly including a hub and a plurality of vanes arranged in longitudinal radial relation about said hub, a drive shaft journaled through said one closed end of said casing and extending inwardly into said sleeve and having the inner end rotatably supported in said hub, a rotor carried by the portion of said drive shaft intermediate said one closed end of said casing and said vane assembly, a cylindrical head positioned within and closing the other end of said sleeve and fixedly connected to said hub, said sleeve having a plurality of spaced radial slots arranged in a circle inwardly of and adjacent to said head, a hollow cylindrical runner facing and surrounding the other end of said sleeve and mounted on said sleeve for longitudinal sliding movement, said runner having three circular rows of turbine blades arranged in longitudinal spaced relation therealong, the blades of one of the rows projecting at an angle from said runner to form a forward drive, the blades of another of the rows projecting from said runner at an angle opposite to that of said one row to form a reverse drive, and the blades of the further of the rows projecting at an angle from said runner different from either of said one and another rows to form a neutral drive, a driven shaft journaled through the other closed end of said casing and extending inwardly through said runner and having the inner end rotatably supported in said head, said runner being connected to said driven shaft for longitudinal reciprocatory movement, and manual means operatively connected to said runner for effecting the reciprocatory movement of the latter.

2. In a fluid coupling, a casing having both ends closed, an open ended sleeve positioned within and extending longitudinally of said casing and spaced from said casing and fixedly secured intermediate its ends to said casing, the space surrounding said sleeve defining a fluid space, one end of said sleeve being adjacent to and spaced from one of the closed ends of said casing, a fixed screen circumposed transversely about said sleeve and spaced from the other end of the latter, a fixed vane assembly in said sleeve inwardly of and spaced from said one closed end of said casing, said assembly including a hub and a plurality of vanes arranged in longitudinal radial relation about said hub, a drive shaft journaled through said one closed end of said casing and extending inwardly into said sleeve and having the inner end rotatably supported in said hub, a rotor carried by the portion of said drive shaft intermediate said one closed end of said casing and said vane assembly, a cylindrical head positioned within and closing the other end of said sleeve and fixedly connected to said hub, said sleeve having a plurality of spaced radial slots arranged in a circle inwardly of and adjacent to said head, a hollow cylindrical runner facing and surrounding the other end of said sleeve and mounted on said sleeve for longitudinal sliding movement, said runner having three circular rows of turbine blades arranged in longitudinal spaced relation therealong, the blades of one of the rows projecting at an angle from said runner to form a forward drive, the blades of another of the rows projecting from said runner at an angle opposite to that of said one row to form a reverse drive, and the blades of the further of the rows projecting at an angle from said runner different from either of said one and another rows to form a neutral drive, a driven shaft journaled through the other closed end of said casing and extending inwardly through said runner and having the inner end rotatably supported in said head, said runner being connected to said driven shaft for longitudinal reciprocatory movement, and manual means operatively connected to said runner for effecting the reciprocatory movement of the latter.

3. In a fluid coupling, a casing having both ends closed, an open ended sleeve positioned within and extending longitudinally of said casing and spaced from said casing and fixedly secured intermediate its ends to said casing, the space surrounding said sleeve defining a fluid space, one end of said sleeve being adjacent to and spaced from one of the closed ends of said casing, a fixed vane assembly in said sleeve inwardly of and spaced from said one closed end of said casing, said assembly including a hub and a plurality of vanes arranged in longitudinal radial relation about said hub, a drive shaft journaled through said one closed end of said casing and extending inwardly into said sleeve and having the inner end rotatably supported in said hub, a rotor embodying a spiral screw carried by the portion of said drive shaft intermediate said one end of said sleeve and said vane assembly, a cylindrical head positioned within and closing the other end of said sleeve, a shank spaced from said sleeve and extending between and connecting said head and said vane assembly together, said sleeve having a plurality of spaced radial slots arranged in a circle inwardly of and adjacent to said head, a hollow cylindrical runner facing and surrounding the other end of said sleeve and mounted on said sleeve for longitudinal sliding movement, said runner having three circular rows of turbine blades arranged in longitudinal spaced relation therealong, the blades of one of the rows projecting at an angle from said runner to form a forward drive, the blades of another of the rows projecting from said runner at an angle opposite to that of said one row to form a reverse drive, and the blades of the further of the rows projecting at an angle from said runner different from either of said one and another rows to form a neutral drive, a driven shaft journaled through the other closed end of said casing and extending inwardly through said runner and having the inner end rotatably supported in said head, said runner being connected to said driven shaft for reciprocatory longitudinal movement, and manual means operatively connected to said runner for effecting the reciprocatory movement of the latter.

4. In a fluid coupling, a casing having both ends closed, an open ended sleeve positioned within and extending longitudinally of said casing and spaced from said casing and fixedly secured intermediate its ends to said casing, the space surrounding said sleeve defining a fluid space, one end of said sleeve being adjacent to and spaced from one of the closed ends of said casing, a fixed screen circumposed about said sleeve and spaced from the other end of the latter, a fixed vane assembly in said sleeve inwardly of and spaced from said one closed end of said casing, said assembly including a hub and a plurality of vanes arranged in longitudinal radial relation about said hub, a drive shaft journaled through said one closed end of said casing and extending inwardly into said sleeve and having the inner end rotatably supported in said hub, a rotor embodying a spiral screw carried by the portion of said drive shaft intermediate said one end of said sleeve and said vane assembly, a cylindrical head positioned within and closing the other end of said sleeve, a shank spaced from said sleeve and extending between and connecting said head and said vane assembly together, said sleeve having a plurality of spaced radial slots arranged in a circle inwardly of and adjacent to said head, said shank being concavely curved and tapering from said head toward and to said vane assembly and forming with the adjacent portion of said sleeve a guiding passage for directing fluid in the sleeve toward the slots in the sleeve, a hollow cylindrical runner facing and surrounding the other end of said sleeve and mounted on said sleeve for longitudinal sliding movement, said runner having three circular rows of turbine blades arranged in longitudinal spaced relation therealong, the blades of one of the rows projecting at an angle from said runner to form a forward drive, the blades of another of the rows projecting from said runner at an angle opposite to that of said one row to form a reverse drive, and the blades of the further of the rows projecting at an angle from said runner different from either of said one and another rows to form a neutral drive, a driven shaft journaled through the other closed end of said casing and extending inwardly through said runner and having the inner end rotatably supported in said head, said runner being connected to said driven shaft for reciprocatory longitudinal movement, and manual means operatively connected to said runner for effecting the reciprocatory movement of the latter.

ROLAND ROBERT MOSHER.

References Cited in the file of this patent

UNITED STATES PATENTS

| Number | Name | Date |
| --- | --- | --- |
| 1,122,303 | Radcliffe | Dec. 29, 1914 |
| 1,672,232 | Saives | June 5, 1928 |
| 2,387,415 | Sibert | Oct. 23, 1945 |
| 2,533,148 | Spiegel | Dec. 5, 1950 |
| 2,597,527 | Mosher | May 20, 1952 |

FOREIGN PATENTS

| Number | Country | Date |
| --- | --- | --- |
| 690,232 | Germany | Sept. 11, 1940 |